United States Patent
Zuo et al.

(10) Patent No.: US 11,103,850 B2
(45) Date of Patent: Aug. 31, 2021

(54) GRAPHITE-LIKE CRYSTALLITE-BASED CARBON NANOMATERIAL, AND PREPARATION METHOD AND APPLICATION THEREOF

(71) Applicant: Nanjing Forestry University, Nanjing (CN)

(72) Inventors: Songlin Zuo, Nanjing (CN); Meng Miao, Nanjing (CN); Yunyang Zhao, Nanjing (CN)

(73) Assignee: Nanjing Forestry University

( * ) Notice: Subject to any disclaimer, the term of this patent is extended or adjusted under 35 U.S.C. 154(b) by 0 days.

(21) Appl. No.: 16/307,508

(22) PCT Filed: Dec. 8, 2017

(86) PCT No.: PCT/CN2017/115233
§ 371 (c)(1),
(2) Date: Dec. 6, 2018

(87) PCT Pub. No.: WO2019/109337
PCT Pub. Date: Jun. 13, 2019

(65) Prior Publication Data
US 2020/0384438 A1    Dec. 10, 2020

(51) Int. Cl.
*C01B 32/205* (2017.01)
*B01J 20/20* (2006.01)
*B01J 20/28* (2006.01)
*B01J 20/30* (2006.01)

(52) U.S. Cl.
CPC ....... *B01J 20/205* (2013.01); *B01J 20/28007* (2013.01); *B01J 20/28016* (2013.01); *B01J 20/3085* (2013.01); *C01B 32/205* (2017.08); *C01P 2004/64* (2013.01); *C01P 2006/40* (2013.01)

(58) Field of Classification Search
CPC .............. B01J 20/28007; B01J 20/3085; B01J 20/28016; C01B 32/05; C01B 32/19;
(Continued)

(56) References Cited

FOREIGN PATENT DOCUMENTS

CN         107343374 A    * 11/2017

OTHER PUBLICATIONS

English machine translation of CN107343374A.*
(Continued)

*Primary Examiner* — Richard M Rump
(74) *Attorney, Agent, or Firm* — IP Attorneys Group

(57) ABSTRACT

The present application provides a graphite-like crystallite-based carbon nanomaterial, and a preparation method and application thereof. The graphite-like crystallite-based carbon nanomaterial provided by the present invention is a carbon nanomaterial having graphite-like crystallites as structural units, and includes, based on 100 parts by mass of chemical composition, 50-60 parts of carbon, 30-50 parts of oxygen, and 1-3 parts of hydrogen, where the structural units of the graphite-like crystallite-based carbon nanomaterial are the graphite-like crystallites; the size of the graphite-like crystallite-based carbon nanomaterial is 5-10 nm; and the graphite-like crystallite-based carbon nanomaterial is a non-fluorescent carbon nanomaterial. The present invention also provides a preparation method of the graphite-like crystallite-based carbon nanomaterial, including: selectively oxidizing a graphite-like microcrystalline charcoal by using an oxidant solution, and etching away an amorphous charcoal bonded between graphite-like crystallites, to achieve the purpose of dissociating the graphite-like microcrystalline charcoal, thereby obtaining a graphite-like crystallite-based carbon nanomaterial.

15 Claims, 7 Drawing Sheets

(58) Field of Classification Search
CPC ..... C01B 32/198; C01B 32/20; C01B 32/205; C01P 2004/64; C01P 2006/40
See application file for complete search history.

(56) References Cited

OTHER PUBLICATIONS

Niu, Xianghong, et al. "Revealing the underlying absorption and emission mechanism of nitrogen doped graphene quantum dots." Nanoscale 8.46 (2016): 19376-19382.*
Zhang, Bo, et al. "Effect of pH conditions on the depolymerization of Wucaiwan coal by mixed acids/ultrasound method and the product structures and performance." International Journal of Coal Science & Technology 4.4 (2017): 342-353.*
Patidar, Rajesh, Babulal Rebary, and Hariom Gupta. "Application of non-fluorescent carbon particles as scavengers for heavy metal ions: A waste utilisation approach." Separation Science and Technology 51.10 (2016): 1618-1626.*
Huang, Du-bin; Chuan, Xiu-Yun, Cao, Xi. Spectroscopy Characterization of Anthracite Oxide, Spectroscopy and Spectral Analysis, 2016, vol. 36, Issue 11, pp. 3698-3703. DOI—10.3964/j.issn.1000-0593(2016)11-3698-06.
Liu, Bin; Gu, Jie; Qui, Pan; Lu, Yucong; Zhou, Jianbin. Adsorption characteristics of dye inaqueous solution by activated carbon from rice husks and its recycling, Acta Scientiae Circumstantiae, 2014, vol. 34, Issue 9, pp. 2256-2264. DOI—10.13671/j.hjkxxb.2014.0723.

* cited by examiner

GRAPHITE-LIKE CRYSTALLITE-BASED CARBON NANOMATERIAL, AND PREPARATION METHOD AND APPLICATION THEREOF

CROSS-REFERENCE TO RELATED APPLICATIONS

This application is a national phase entry of International Application No. PCT/CN2017/115233, having a filing date of Dec. 8, 2017, and titled "GRAPHITE-LIKE CRYSTALLITE-BASED CARBON NANOMATERIAL, AND PREPARATION METHOD AND APPLICATION THEREOF." The contents of the above-identified Application is relied upon and incorporated herein by reference in its entirety.

TECHNICAL FIELD

The present invention relates to the technical field of carbon nanomaterials, and in particular, to a graphite-like crystallite-based carbon nanomaterial, and a preparation method and application thereof.

BACKGROUND

Carbon nanomaterials refer to carbon materials having at least one dimension of less than 100 nm. The carbon nanomaterials mainly include four types: graphene, carbon nanotubes, carbon nanofibers, and carbon nanospheres. Due to the unique structural features of the carbon nanomaterials, the carbon nanomaterials have unusual physical, chemical and mechanical properties, are considered to have broad application prospects in the fields of one-dimensional conductors, super-strong composite materials, super-hard materials, hydrogen storage materials, catalysts, catalyst carriers, and high-efficiency adsorbents, wave absorbing materials, and the like, and are highly valued by researchers.

Wood charcoals, bamboo charcoals, shell charcoals, and conventional charcoal materials, such as activated charcoals and charcoal black, prepared by activating these charcoals are all graphite-like microcrystalline charcoals, that is, basic structural units constituting them are graphite-like crystallites, and the structures thereof are shown in the left drawing of FIG. 1. Graphite-like crystallites refer to crystallites similar in structure to graphite, and are formed by stacking several layers of hexagonal carbon network planes in an approximately parallel manner. Graphite-like crystallites range in size from several nanometers to several tens of nanometers, and the size of the graphite-like crystallites in wood charcoals and activated charcoals is typically on the order of several nanometers.

A graphite-like microcrystalline charcoal can be reduced in size to several hundreds of nanometers or several tens of nanometers by means of mechanical grinding, which leads to a very high energy consumption, and the particle size and morphology of the charcoal cannot be controlled during the grinding process. Alternatively, by using an oxidant, such as concentrated nitric acid, fluorescent carbon quantum dots having a size of several nanometers can be prepared by etching the surfaces of activated charcoals and charcoal black under a certain temperature for a long period of time. However, none of these methods can achieve the dissociation of the graphite-like microcrystalline charcoal, and the preparation of a carbon nanomaterial structurally based on graphite-like crystallites.

SUMMARY

The present application provides a graphite-like crystallite-based carbon nanomaterial, a preparation method and application thereof. The present invention obtains a carbon nanomaterial structurally based on graphite-like crystallites.

To solve the above technical problem, the present invention discloses the following technical solutions:

The present invention provides a graphite-like crystallite-based carbon nanomaterial, including, based on 100 parts by mass of chemical composition, 50-60 parts of carbon, 30-45 parts of oxygen, and 1-3 parts of hydrogen, where structural units of the graphite-like crystallite-based carbon nanomaterial are graphite-like crystallites; the particle size of the graphite-like crystallite-based carbon nanomaterial is 5-10 nm; and the graphite-like crystallite-based carbon nanomaterial is a non-fluorescent carbon nanomaterial.

Preferably, the thickness of the graphite-like crystallite-based carbon nanomaterial is less than or equal to 1.5 nm.

Preferably, the graphite-like crystallite-based carbon nanomaterial is a polar carbon nanomaterial.

Preferably, the graphite-like crystallite-based carbon nanomaterial is dispersed in an acidic aqueous solution, an alkaline aqueous solution, and a neutral aqueous solution.

Preferably, the graphite-like crystallite-based carbon nanomaterial contains a carboxyl group, a carbonyl group, a hydroxyl group, and an ether group.

The present invention further provides a preparation method of the graphite-like crystallite-based carbon nanomaterial of the above technical solution, including the following steps:

(1) mixing an oxidant solution with a graphite-like microcrystalline charcoal material, and oxidizing the mixture under the conditions of microwave heating to obtain an oxidizing feed solution; the oxidant solution including a mixed solution of a first acid and a second acid; and the first acid being nitric acid and the second acid being perchloric acid or sulfuric acid;

(2) regulating the pH value of the oxidizing feed solution obtained in step (1) to 3-8, to obtain a prefiltration system;

(3) subjecting the prefiltration system obtained in step (2) to ultrafiltrations, to obtain a suspension and a filtrate;

(4) separating the suspension obtained in step (3), to obtain a fine suspension; and (5) removing moisture in the fine suspension obtained in step (4), to obtain the graphite-like crystallite-based carbon nanomaterial.

Preferably, the ratio of the mass of the graphite-like microcrystalline charcoal material to the volume of the oxidant solution in step (1) is 1 g:(20-50)mL;

the molar ratio of the first acid to the second acid in the oxidant solution is (0.5-2):1;

the oxidant solution is obtained by mixing a first acid solution and a second acid solution; the mass concentration of the first acid solution is 65-68%, and the mass concentration of the second acid solution is 70-72%; and the volume ratio of the first acid solution to the second acid solution is 1:(0.5-2.5).

Preferably, the power of the microwave heating in step (1) is 500-1,000 W.

Preferably, the temperature of the microwave heating in step (1) is 75-110° C., and the time of the microwave heating is 10-150 min.

Preferably, the graphite-like microcrystalline charcoal material in step (1) includes one or more of a wood charcoal, a bamboo charcoal, a shell charcoal, a wood-based activated charcoal, a shell activated charcoal, a bamboo activated charcoal, and a coal-based activated charcoal.

Preferably, the number of the ultrafiltrations in step (3) is based on the electrical conductivity of the filtrate obtained by the ultrafiltrations, and the ultrafiltrations are completed when the electrical conductivity of the filtrate obtained by the ultrafiltrations reaches 20 us/cm or less.

Preferably, the molecular weight cut off of an ultrafiltration membrane for the ultrafiltrations in step (3) is 1,000 Da.

Preferably, after a filtrate is further obtained after the ultrafiltrations in step (3), the filtrate is concentrated, dialyzed and dried in sequence to obtain fluorescent carbon nanoparticles, where the particle size of the fluorescent carbon nanoparticles is 1-3 nm.

Preferably, the separations in step (4) are centrifugations; there are at least three centrifugations, and the time of each centrifugation is 10 min; and the rotational speed of each centrifugation is independently 4,000-8,000 rpm.

Preferably, micron-sized carbon particles are further obtained after the separations in step (4).

Preferably, the moisture is removed in step (5) by concentration and drying in sequence.

The present invention further provides application of the graphite-like crystallite-based carbon nanomaterial of the above technical solution or the graphite-like crystallite-based carbon nanomaterial prepared by the preparation method of the above technical solution as a metal ion adsorbent.

The present invention further provides application of the graphite-like crystallite-based carbon nanomaterial of the above technical solution or the graphite-like crystallite-based carbon nanomaterial prepared by the preparation method of the above technical solution in preparation of a carbon nanofilm.

The present invention provides a graphite-like crystallite-based carbon nanomaterial, including, based on 100 parts by mass of chemical composition, 50-60 parts of carbon, 30-45 parts of oxygen, and 1-3 parts of hydrogen, where the graphite-like crystallite-based carbon nanomaterial is structurally based on graphite-like crystallites; the particle size of the graphite-like crystallite-based carbon nanomaterial is 5-10 nm; and the graphite-like crystallite-based carbon nanomaterial is a non-fluorescent carbon nanomaterial. The present invention provides a carbon nanomaterial structurally based on graphite-like crystallites.

The present invention also provides a preparation method of a graphite-like crystallite-based carbon nanomaterial, including: mixing an oxidant solution with a graphite-like microcrystalline charcoal, and then oxidizing the mixture by heating to obtain an oxidizing feed solution, where the oxidant solution includes a mixed solution of a first acid and a second acid, the first acid being nitric acid and the second acid is perchloric acid or sulfuric acid; regulating the pH value of the obtained oxidizing feed solution to 3-8, to obtain a prefiltration system, and then performing ultrafiltration washing to obtain a suspension; and subjecting the obtained suspension to separation, rotary-evaporation concentration, and drying to obtain a graphite-like crystallite-based carbon nanomaterial. In the preparation method provided by the present invention, the graphite-like microcrystalline charcoal is oxidized using the oxidant solution under the conditions of microwave heating, and an amorphous charcoal bonded between the graphite-like crystallites is selectively etched away, so that the dissociation of the graphite-like microcrystalline charcoal is achieved to obtain a carbon nanomaterial having graphite-like crystallites as structural units, layer-by-layer surface etching of the microcrystalline charcoal is avoided, and the preparation efficiency is improved.

DETAILED DESCRIPTION

Figure 1:
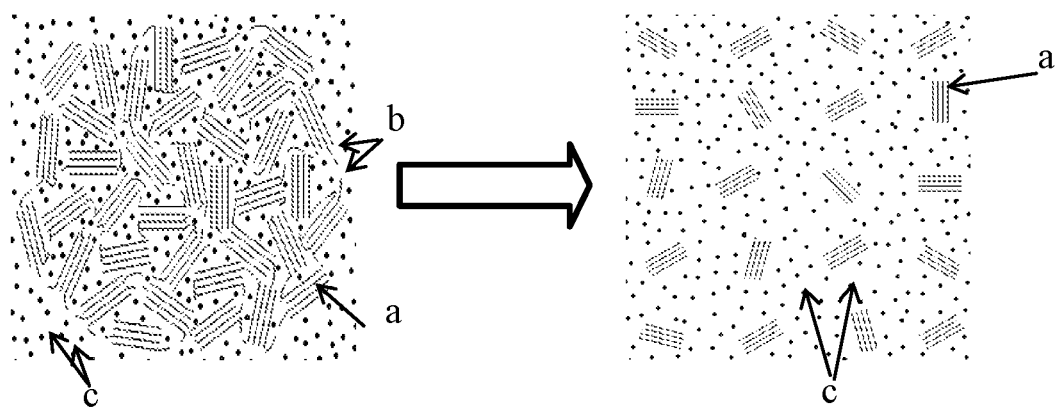
FIG. 1 is a schematic diagram of oxidative dissociation of a graphite-like microcrystalline charcoal with an oxidant solution according to the present invention, where a represents graphite-like crystallites, b represents a substance bonded to the graphite-like crystallites, and c represents the oxidant solution.

The present invention provides a graphite-like crystallite-based carbon nanomaterial, including, based on 100 parts by mass of chemical composition, 50-60 parts of carbon, 30-45 parts of oxygen, and 1-3 parts of hydrogen. In the present invention, based on a total of 100 parts by mass of the graphite-like crystallite-based carbon nanomaterial, the graphite-like crystallite-based carbon nanomaterial includes 50-60 parts of carbon, and preferably 51-55 parts. In the present invention, based on a total of 100 parts by mass of the graphite-like crystallite-based carbon nanomaterial, the graphite-like crystallite-based carbon nanomaterial includes 30-45 parts of oxygen, preferably 32-40 parts, and more preferably 35-38 parts. In the present invention, based on a total of 100 parts by mass of the graphite-like crystallite-based carbon nanomaterial, the graphite-like crystallite-based carbon nanomaterial includes 1-3 parts of hydrogen, preferably 1.5-2.5 parts, and more preferably 2 parts.

In the present invention, structural units of the graphite-like crystallite-based carbon nanomaterial are graphite-like crystallites; and the particle size of the graphite-like crystallite-based carbon nanomaterial is 5-10 nm, preferably 6-8 nm, and more preferably 6.5-7 nm. In the present invention, the thickness of the graphite-like crystallite-based carbon nanomaterial is preferably less than or equal to 1.5 nm, and more preferably less than or equal to 1.2 nm.

In the present invention, the graphite-like crystallite-based carbon nanomaterial is preferably a polar carbon nanomaterial; the graphite-like crystallite-based carbon nanomaterial can be dispersed in an acidic aqueous solution, a neutral aqueous solution, and an alkaline aqueous solution; the dispersion quantities of the graphite-like crystallite-based carbon nanomaterial in neutral and alkaline water preferably reach 40-100 mg/L or more, and more preferably 50-80 mg/L; and the dispersion quantity of the graphite-like crystallite-based carbon nanomaterial in acidic water reaches 1 mg/L. In the present invention, the graphite-like crystallite-based carbon nanomaterial cannot be dispersed in a strong polar solvent, for example, cannot be dispersed in methanol or ethanol.

In the present invention, the graphite-like crystallite-based carbon nanomaterial contains rich surface functional groups on the surface thereof, and thus has a relatively strong polarity. In the present invention, the graphite-like crystallite-based carbon nanomaterial preferably contains a carboxyl group, a carbonyl group, a hydroxyl group, and an ether group.

In the present invention, the graphite-like crystallite-based carbon nanomaterial is a non-fluorescent carbon nanomaterial, and thus has no fluorescence.

The present invention also provides a preparation method of the graphite-like crystallite-based carbon nanomaterial of the above technical solution, including the following steps:

(1) mixing an oxidant solution with a graphite-like microcrystalline charcoal material, and subjecting the mixture to oxidation under heating conditions to obtain an oxidizing feed solution; the oxidant solution including a mixed solution of a first acid and a second acid; and the first acid being nitric acid and the second acid being perchloric acid or sulfuric acid;

(2) regulating the pH value of the oxidizing feed solution obtained in step (1) to 3-8, to obtain a prefiltration system;

(3) subjecting the prefiltration system obtained in step (2) to ultrafiltrations, to obtain a suspension and a filtrate;

(4) separating the suspension obtained in step (3), to obtain a fine suspension; and (5) removing moisture in the fine suspension obtained in step (4), to obtain the graphite-like crystallite-based carbon nanomaterial.

In the present invention, the oxidant solution is mixed with the graphite-like microcrystalline charcoal material, and then the mixture is subjected to oxidation under the conditions of microwave heating to obtain the oxidizing feed solution.

In the present invention, the ratio of the mass of the graphite-like microcrystalline charcoal to the volume of the oxidant solution in step (1) is preferably 1 g:(10-40)mL, more preferably 1 g:(15-35)mL, and still more preferably 1 g:(20-30)mL.

In the present invention, the oxidant solution includes the mixed solution of the first acid and the second acid; the first acid is nitric acid and the second acid is perchloric acid or sulfuric acid. In the present invention, the molar ratio of the first acid to the second acid in the oxidant solution is preferably (0.5-2):1, more preferably (0.8-1.5):1, and still more preferably (1.0-1.2):1. In the present invention, the oxidant solution is preferably obtained by mixing a first acid solution and a second acid solution; the mass concentration of the first acid solution is preferably 65-68%, and more preferably 66-67%; and the mass concentration of the second acid solution is preferably 70-72%, and more preferably 71-71.5%. In the present invention, the oxidant solution can penetrate into the graphite-like microcrystalline charcoal, and there is no need of layer-by-layer oxidation and layer-by-layer etching on the surface of the raw material, so that oxidative etching of the amorphous charcoal in the graphite-like microcrystalline charcoal can be implemented in a short time, thereby leading to the dissociation of the graphite-like microcrystalline charcoal in a short time, and improving the yield and preparation efficiency of the carbon nanomaterial.

In the present invention, the graphite-like microcrystalline charcoal material preferably includes a biomass charcoal, and more preferably includes one or more of a wood charcoal, a bamboo charcoal, a shell charcoal, a wood-based activated charcoal, a shell activated charcoal, a bamboo activated charcoal, and a coal-based activated charcoal. In the present invention, when the graphite-like microcrystalline charcoal material is a wood charcoal, a bamboo charcoal, or a shell charcoal, the preparation method of the graphite-like microcrystalline charcoal material preferably includes: carbonizing a biomass material to obtain a graphite-like microcrystalline charcoal. The present invention has no special requirements for the specific implementation mode of the carbonization, and any biomass carbonization approach well known to persons skilled in the art can be used. When the graphite-like microcrystalline charcoal material is a wood-based activated charcoal, a shell activated charcoal, or a bamboo activated charcoal, the preparation method of the graphite-like microcrystalline charcoal material preferably includes: activating the biomass material to obtain a graphite-like microcrystalline charcoal. The present invention has no special requirements for the preparation approach of the activated charcoal, and any biomass activation approach well known to persons skilled in the art can be used.

The present invention has no special requirements for the mixing approach of the oxidant solution and the graphite-like microcrystalline charcoal material, and any material mixing approach well known in the art can be used.

After the mixing, the mixed feed solution is subjected to oxidation under the conditions of microwave heating in the present invention to obtain an oxidizing feed solution. In the present invention, the power of the microwave heating is preferably 500-800 W, and more preferably 550-750 W; the temperature of the microwave heating is preferably 75-110° C., and more preferably 80-100° C.; and the time of the microwave heating is preferably 10-150 min, more preferably 20-120 min, and still more preferably 30-60 min. The present invention has no special requirements for the provision form of the microwave heating, and any microwave heating approach well known to persons skilled in the art can be used. In the embodiments of the present invention, the microwave heating is completed in a microwave synthesizer.

As shown in FIG. 1 which is a schematic diagram of oxidative dissociation of a graphite-like microcrystalline charcoal with an oxidant solution, in the present invention, the mixed feed solution implements the oxidation of the graphite-like microcrystalline charcoal material under heating conditions, and amorphous carbon bonded to the graphite-like crystallites in the graphite-like microcrystalline charcoal material is oxidatively etched away, so that the amorphous charcoal bonded between the graphite-like crystallites is selectively and oxidatively etched away, and the graphite-like microcrystalline charcoal is dissociated, thereby obtaining the graphite-like crystallite-based carbon nanomaterial without etching the raw material layer by layer. In FIG. 1, a represents a graphite-like crystallite structure unit, b represents a substance bonded to the graphite-like crystallites, and c represents the oxidant solution.

In the present invention, the oxidation is preferably carried out under stirring. The present invention has no special requirements for the specific implementation mode of the stirring, as long as sufficient contact between the graphite-like microcrystalline charcoal and the oxidant solution can be achieved.

After the oxidation, the oxidized product is preferably cooled to room temperature in the present invention to obtain the oxidizing feed solution. The present invention has no special requirements for the specific implementation mode of the cooling, and any temperature-reduction cooling approach well known to persons skilled in the art can be used.

After the oxidizing feed solution is obtained, the pH value of the oxidizing feed solution obtained by the oxidation is regulated to 3-8 in the present invention, to obtain a prefiltration system. In the present invention, the pH regulator is preferably an alkaline solution, and more preferably is ammonia water, a potassium hydroxide solution, or a sodium hydroxide solution. In the present invention, the alkaline solution neutralizes the acid remaining after the oxidation to prevent a solution having strong acidity and strong oxidizing properties from corroding a filter container. The present invention has no special requirements for the mass concentration and the dosage of the alkaline solution, as long as a prefiltration system having a target pH value can be obtained. In the present invention, the pH value of the prefiltration system is 3-8, and preferably 6-7.

After the prefiltration system is obtained, the obtained prefiltration system is subjected to ultrafiltrations in the present invention to obtain a suspension. In the present invention, the number of the ultrafiltrations is preferably at least one, and is preferably based on the electrical conductivity of the filtrate obtained by the ultrafiltrations; and when the electrical conductivity of the filtrate obtained by the ultrafiltrations is less than 20 us/cm, the ultrafiltrations are completed. The present invention has no special requirements for the test approach of the electrical conductivity of the filtrate, and any approach well known to persons skilled in the art can be used. In the present invention, the molecular weight cut off of an ultrafiltration membrane for the ultrafiltrations is preferably 1000 Da. The present invention has no special requirements for the specific source of the ultrafiltration membrane, and any commercially available ultrafiltration membrane well known to persons skilled in the art can be used. In the present invention, the ultrafiltration washing is preferably to make the prefiltration system flow through the ultrafiltration membrane to obtain a filtrate and a retentate. When the filtrate is not colorless and transparent and the electrical conductivity is not reduced to 20 us/cm or less, ultrafiltration washing is continued to be performed on the retentate by using the ultrafiltration membrane to obtain a filtrate and a retentate; the retentate obtained by continuous washing is ultrafiltered using the ultrafiltration membrane, until the electrical conductivity the filtrate obtained is 20 us/cm or less, and at this time, the filtrate is colorless and transparent. In the present invention, after the ultrafiltrations are completed, the retentate retained in an ultrafiltration cup is the suspension.

A filtrate is obtained after the ultrafiltrations. The present invention preferably further includes concentrating, dialyzing and drying the filtrate in sequence to obtain fluorescent carbon nanoparticles. In the present invention, the concentration approach is preferably rotary-evaporation concentration. The present invention has no special requirements for the specific requirements for the rotary-evaporation concentration approach, and any rotary-evaporation concentration approach well known to persons skilled in the art can be used. When the number of ultrafiltration washings is more than one, the filtrate obtained by each ultrafiltration washing is preferably collected in the present invention for the concentration.

After the concentration, in the present invention, the obtained concentrate is preferably dialyzed to remove salts in the concentrate to obtain a purified concentrate. In the present invention, the molecular weight cut off of a dialysis membrane for the dialysis is preferably 500 Da.

In the present invention, the purified concentrate is preferably dried to obtain the fluorescent carbon nanoparticles. In the present invention, the drying is preferably freeze drying. The present invention has no special requirements for the specific implementation mode of the freeze drying, and any freeze drying approach well known to persons skilled in the art can be used. In the present invention, the particle size of the fluorescent carbon nanoparticles is preferably 1-3 nm.

The suspension is obtained after the ultrafiltrations, and the suspension is separated in the present invention to obtain a fine suspension. In the present invention, relatively coarse charcoal particles are removed by means of the ultrafiltrations to obtain a suspension containing fine charcoal particles, that is, the fine suspension. In the present invention, the separations are preferably centrifugations. In the present invention, the number of the centrifugations is preferably at least three, and more preferably 4-8, and still more preferably 5-6; and the time of each centrifugation is preferably 10 min. In the present invention, the rotational speed of each centrifugation is independently and preferably 4,000-8,000 rpm, more preferably 4,200-8,000 rpm, and still more preferably 5,000-6,000 rpm. In the present invention, by means of the separations, micron-sized carbon particles in the suspension are separated from the suspension, thereby obtaining a suspension of charcoal particles and micron-sized carbon particles.

In the present invention, moisture in the obtained fine suspension is removed, to obtain the graphite-like crystallite-based carbon nanomaterial. The present invention has no special requirements for the removal approach of the moisture, and any moisture removal approach well known to persons skilled in the art can be used. In the present invention, the removal of the moisture is preferably performed by concentration and drying in sequence; the concentration is further preferably rotary-evaporation concentration; and the drying is preferably heat drying or freeze drying. In the embodiments of the present invention, the pressure of the freeze drying is preferably 15 Pa or less; and the temperature of the heat drying is preferably 110° C. In the present invention, the dried material obtained after the drying is the graphite-like crystallite-based carbon nanomaterial.

In the present invention, the graphite-like microcrystalline charcoal material is oxidized to obtain three types of carbon materials: a micron-sized carbon material (CMP), graphite-like crystallite-based carbon materials (L-CNPs), and fluorescent carbon nanomaterials (S-CNPs); the micron-sized carbon material (CMP) is large-sized charcoal particles obtained by centrifugation in a suspension obtained by ultrafiltering the feed solution subjected to the oxidation; the graphite-like crystallite-based carbon materials (L-CNPs) are obtained by drying the suspension obtained after separating the CMP from the suspension obtained by ultrafiltrations; and the fluorescent carbon nanomaterials (S-CNPs) are obtained by concentrating, dialyzing and drying the filtrate obtained by ultrafiltrations after the oxidation. L-CNPs do not have the property of fluorescence, while S-CNPs can fluoresce, and the size of S-CNPs is less than that of L-CNPs; moreover, the raw charcoal of the graphite-like microcrystalline charcoal also generates a gas, such as carbon dioxide, after being oxidized with the oxidant, so that the production of a very obvious gas product can be observed during the preparation process. The reaction form in which the raw charcoal is oxidized is as follows:

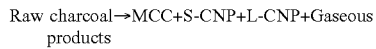

Raw charcoal→MCC+S-CNP+L-CNP+Gaseous products

The present invention also provides application of the graphite-like crystallite-based carbon nanomaterial of the above technical solution as a metal ion adsorbent. In the present invention, the metal ions are preferably copper ions and/or lead ions. The present invention has no special requirements for the application mode of the graphite-like crystallite-based carbon nanomaterial as the metal ion adsorbent, and any application mode well known to persons skilled in the art can be used.

In the present invention, the graphite-like crystallite-based carbon nanomaterial is added to a metal salt solution to implement adsorption of the metal ions by the graphite-like crystallite-based carbon nanomaterial, thereby obtaining a metal-carbon nanocomposite material.

The present invention also provides application of the graphite-like crystallite-based carbon nanomaterial of the above technical solution in preparation of a carbon nanofilm. In the present invention, the application of the graphite-like crystallite-based carbon nanomaterial in preparation of the carbon nanofilm is preferably self-assembly of the graphite-like crystallite-based carbon nanomaterial into a carbon nanofilm; the thickness of the carbon nanofilm is preferably 5-100 nm.

The following describes in detail the graphite-like crystallite-based carbon nanomaterial, the preparation method and application thereof provided by the present invention with reference to the embodiments which, however, are not to be construed as limiting the scope of protection of the present invention.

Embodiment 1

Nitric acid is mixed proportionally with perchloric acid according to the substance quantity ratio of 1:1, and an acid A solution is mixed with an acid B solution according to the volume ratio of 1:1.1 to prepare an oxidant solution, where the mass concentration of the nitric acid solution is 65%, and the mass concentration of the perchloric acid solution is 70%.

4.00 g of coconut shell activated charcoal of 60-80 meshes is mixed with 100 mL of oxidant solution; the mixed solution is placed in a microwave synthesizer, and heated to 100° C. under microwave power of 500 W; and the heating is stopped after stirring for 60 min.

The reaction liquid is cooled to room temperature, and an alkaline solution is added to neutralize the acid solution until the pH value of the solution reaches 5. The reaction liquid with a well regulated pH is transferred into an ultrafiltration cup, and ultrafiltration washing is performed on the reactant by using an ultrafiltration membrane having a molecular weight cut off of 1000 Da until the filtrate becomes colorless and transparent and the electrical conductivity is less than 20 us/cm.

The suspension in the ultrafiltration cup is repeatedly centrifuged three times in a centrifuge having a rotational speed of 4000 rpm for 10 min each time to remove large particles, and the large particles obtained by the centrifugations are collected, i.e., micron-sized particles (CMP); the filtrate from each ultrafiltration washing process is collected together for rotary-evaporation concentration, then salts in the concentrated filtrate are removed by dialysis, and finally freeze drying is performed to obtain fluorescent carbon nanoparticles (S-CNPs) of small particle size; the centrifuged suspension is subjected to rotary-evaporation concentration, and then is freeze-dried or heat-dried to remove moisture to obtain graphite-like crystallite-based carbon nanoparticles (L-CNPs).

Figure 2:
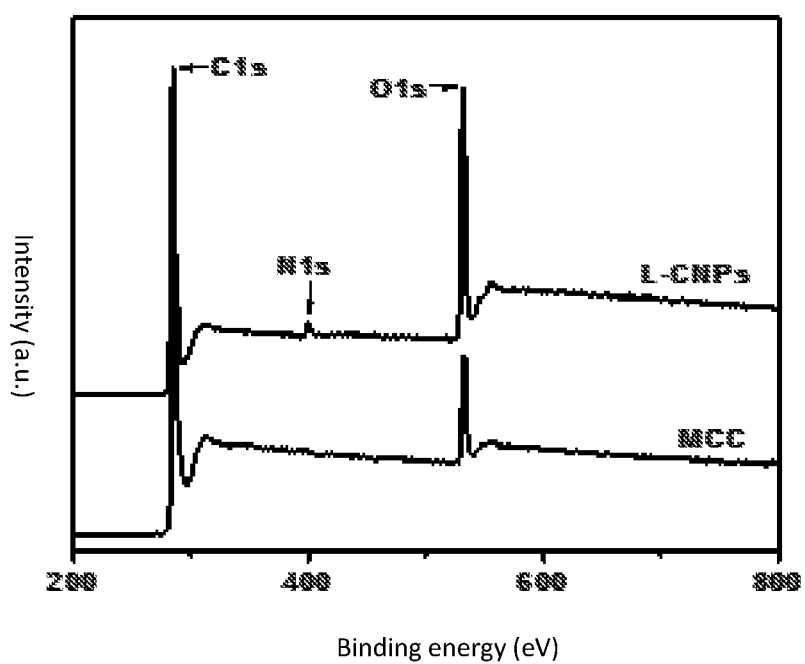
FIG. 2 is an X-ray photoelectron spectroscopy chart of a graphite-like crystallite-based carbon nanomaterial prepared in Embodiment 1 of the present invention.
Figure 3:
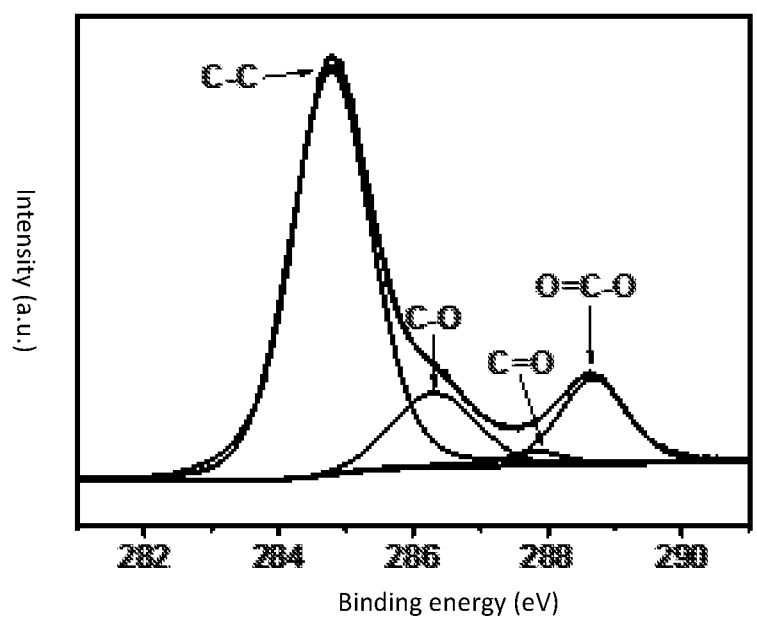
FIG. 3 is a fitting diagram of oxygen atom binding energy of the X-ray photoelectron spectroscopy chart of the graphite-like microcrystalline carbon nanomaterial prepared in Embodiment 1 of the present invention.

X-ray photoelectron spectroscopy analysis is performed on the prepared graphite-like crystallite-based carbon nanoparticles, and the test result is shown in FIG. 2; and the carbon spectrum fitting analysis chart of the X-ray photoelectron spectroscopy of the graphite-like crystallite-based carbon nanomaterials is shown in FIG. 3. It can be known from FIGS. 2 and 3 that the prepared graphite-like crystallite-based carbon nanoparticles are rich in carboxyl groups, carbonyl groups, and C—O single bonds.

Figure 4:
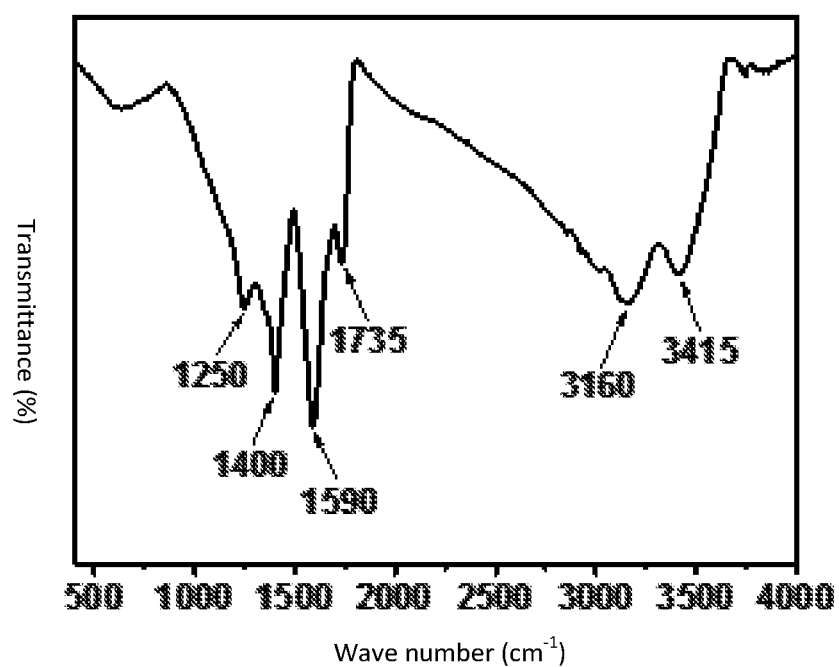
FIG. 4 is an infrared spectrogram of the graphite-like crystallite-based carbon nanomaterial prepared in Embodiment 1 of the present invention.

Infrared spectroscopy analysis is performed on the prepared graphite-like crystallite-based carbon nanoparticles, and the test result is shown in FIG. 4.

It can be known from FIG. 4 that the prepared graphite-like crystallite-based carbon nanoparticles contain a strong aromatic ring skeleton vibration peak (1590 cm$^{-1}$), and also contain a strong carbonyl vibration peak (1735 cm$^{-1}$) and a stretching vibration peak of a hydroxyl group (1398 cm$^{-1}$). It is indicated that the obtained graphite-like crystallite-based carbon nanoparticles contain a large quantity of carboxyl groups, carbonyl groups, and hydroxyl groups.

Figure 5:
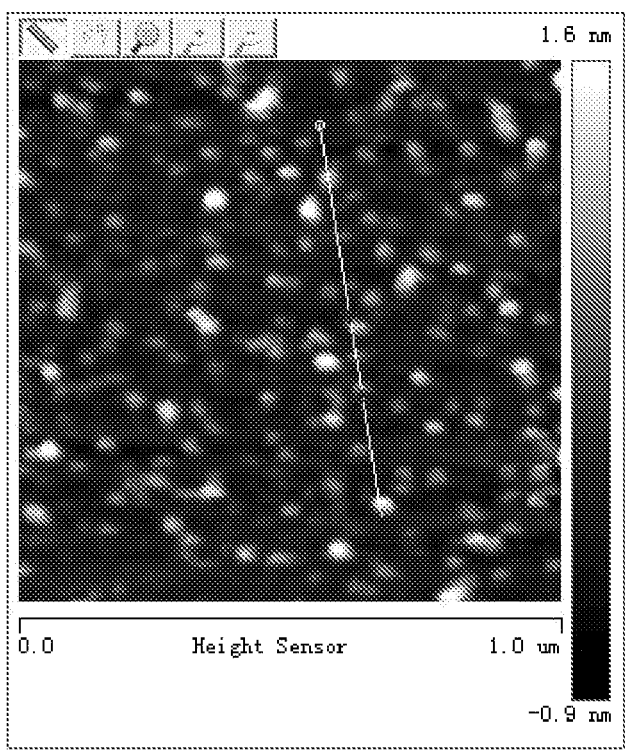
FIG. 5 is an atomic force micrograph of the graphite-like crystallite-based carbon nanomaterial prepared in Embodiment 1 of the present invention.
Figure 6:
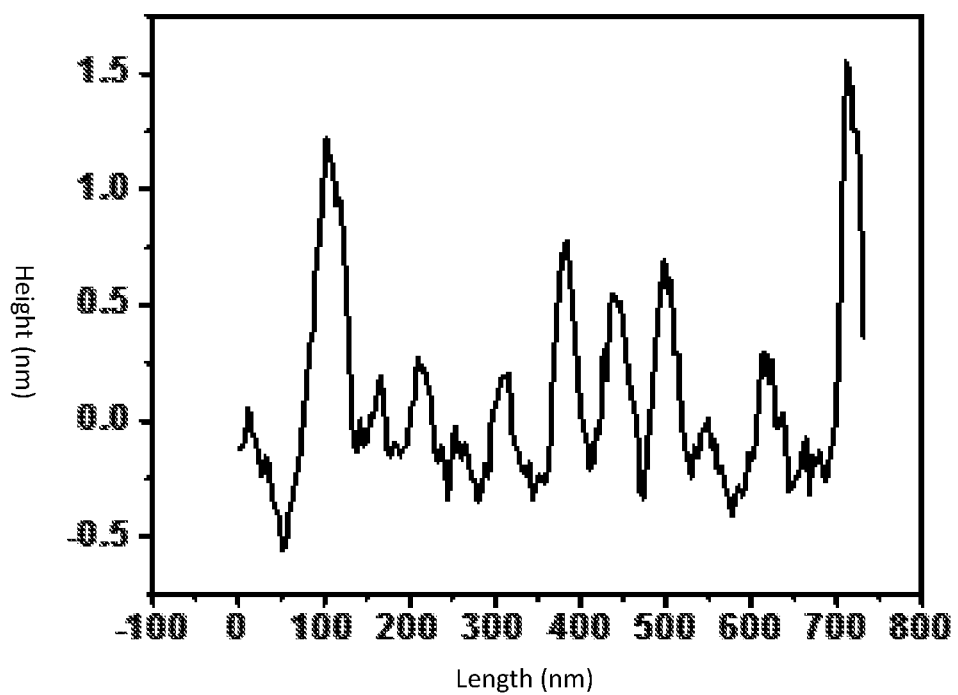
FIG. 6 is a statistical graph of the thickness size of an atomic force micrograph picture of the graphite-like crystallite-based carbon nanomaterial prepared in Embodiment 1 of the present invention.

Atomic force microscopy analysis is performed on the prepared graphite-like crystallite-based carbon nanoparticles, and the atomic force micrograph is shown in FIG. 5; and statistical analysis is performed according to the measured particle thickness size in the atomic force micrograph to obtain particle size data of the graphite-like crystallite-based carbon nanoparticles, as shown in FIG. 6. It can be known from FIG. 6 that the thickness size of the prepared carbon nanoparticles is not more than 1.5 nanometers, and is consistent with that of graphite-like crystallites generally consisting of several layers of hexagonal carbon network planes.

The L-CNPs obtained by the present invention have a size of 5-10 nanometers and a thickness of less than 1.5 nanometers. Moreover, between the micron-sized carbon particles and the L-CNPs of 10 nanometers or less, almost no charcoal particles having a size of between microns and 10 nanometers are found. No matter at which reaction temperature and reaction time, or even at the reaction time of less than 30 minutes, there are no particles having a size between microns and 10 nanometers. Therefore, it can be confirmed that in the reaction process, not the carbon particles having a size of less than 10 nanometers are prepared by layer-by-layer surface etching, but carbon particle products (except gas reactants) mainly based on the L-CNPs are formed by breaking the bonding between the graphite-like crystallites. Furthermore, the yield of the L-CNPs can reach 40% or more, which is sufficient to prove that the L-CNPs are oxides derived from the basic structural units, the graphite-like crystallites, of the microcrystalline charcoal.

Figure 7:
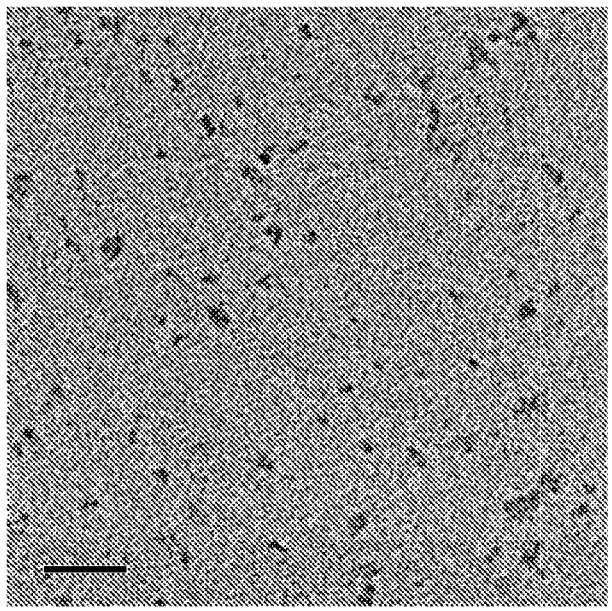
FIG. 7 is a TEM image of the graphite-like crystallite-based carbon nanomaterial prepared in Embodiment 1 of the present invention.

Transmission electron microscopy analysis is performed on the prepared graphite-like crystallite-based carbon nanoparticles, and the result is shown in FIG. 7. It can be known from FIG. 7 that the size of the prepared graphite-like crystallite-based carbon nanoparticles is about 5-10 nanometers.

Figure 8:
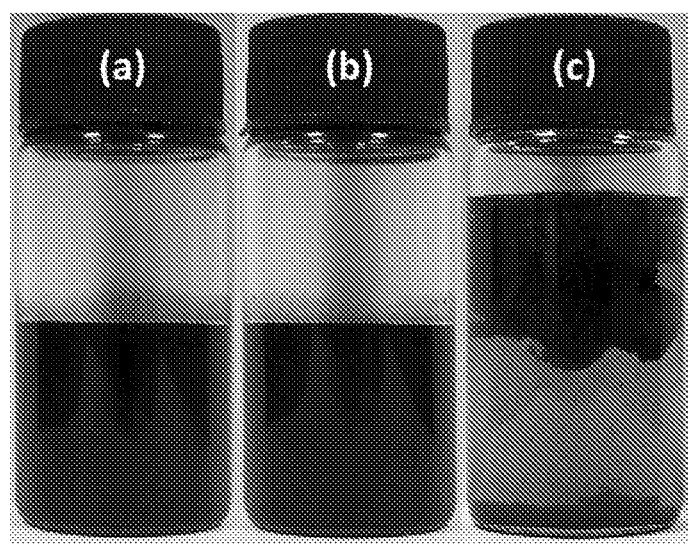
FIG. 8 is a view showing dispersion states of the graphite-like crystallite-based carbon nanomaterial prepared in Embodiment 1 in water and methanol according to the present invention.

The prepared graphite-like crystallite-based carbon nanoparticles are subjected to dispersibility analysis, and the dispersion state in water is shown by a in FIG. 8; the graphite-like crystallite-based carbon nanoparticles are dispersed in water, and the state after standing for 2 months is shown by b in FIG. 8; and the dispersion state of the graphite-like crystallite-based carbon nanoparticles in methanol is shown by c in FIG. 8. It can be known from FIG. 8 that the prepared graphite-like crystallite-based carbon nanoparticles can be well dispersed in water to form a suspension and can exist stably, but cannot be dispersed in a methanol solvent. It is indicated that the prepared graphite-like crystallite-based carbon nanoparticles contains rich surface functional groups on the surfaces thereof, and thus have a relatively strong polarity.

Figure 9:
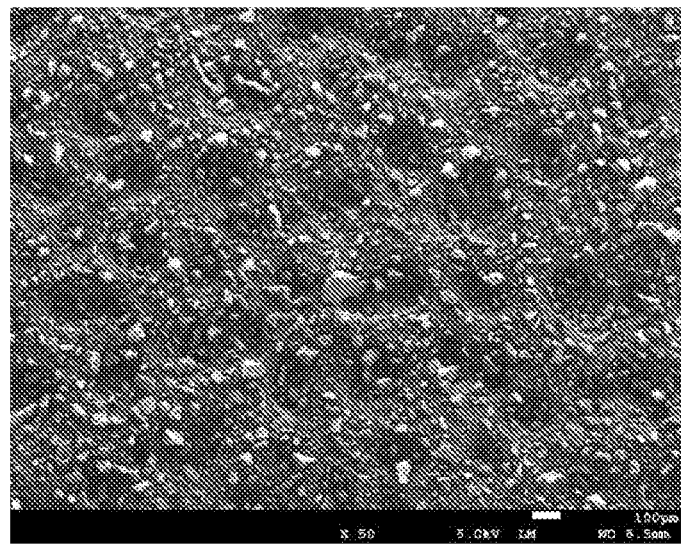
FIG. 9 is a SEM image of a micron-sized carbon material prepared in Embodiment 1 of the present invention.

Scanning electron microscope scan is performed on the prepared micron-sized carbon particles, and the result is shown in FIG. 9. It can be known from FIG. 9 that the size of the carbon particles is on the order of microns.

Figure 10:
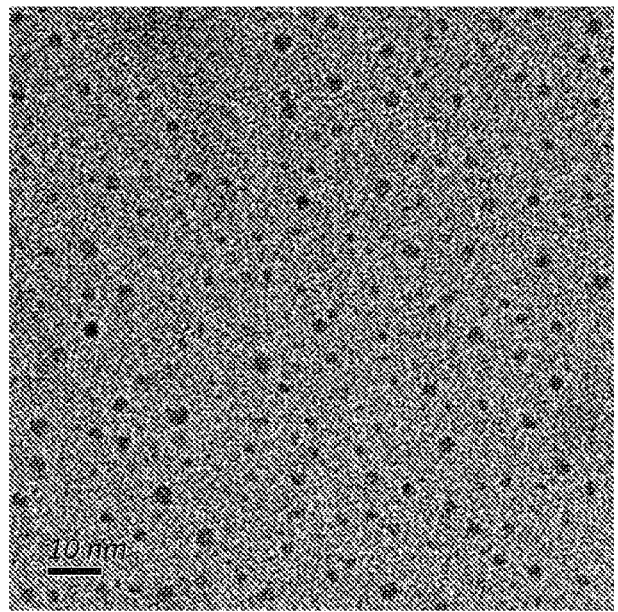
FIG. 10 is a TEM image of a fluorescent carbon nanomaterial prepared in Embodiment 1 of the present invention.
Figure 11:
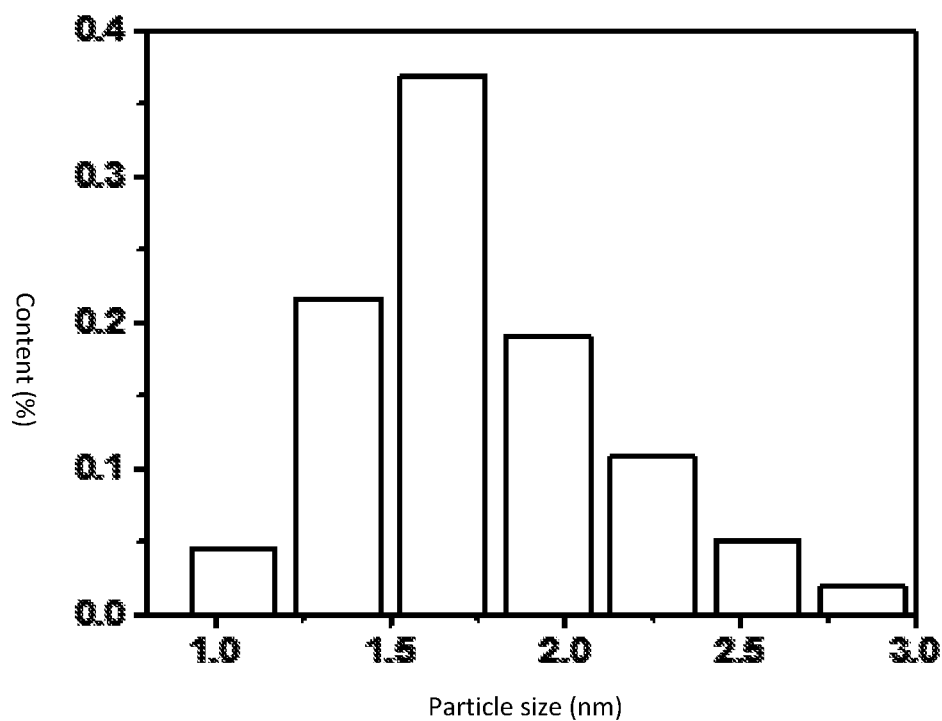
FIG. 11 is a statistical diagram of the size of the fluorescent carbon nanomaterial prepared in Embodiment 1 of the present invention.
Figure 12:
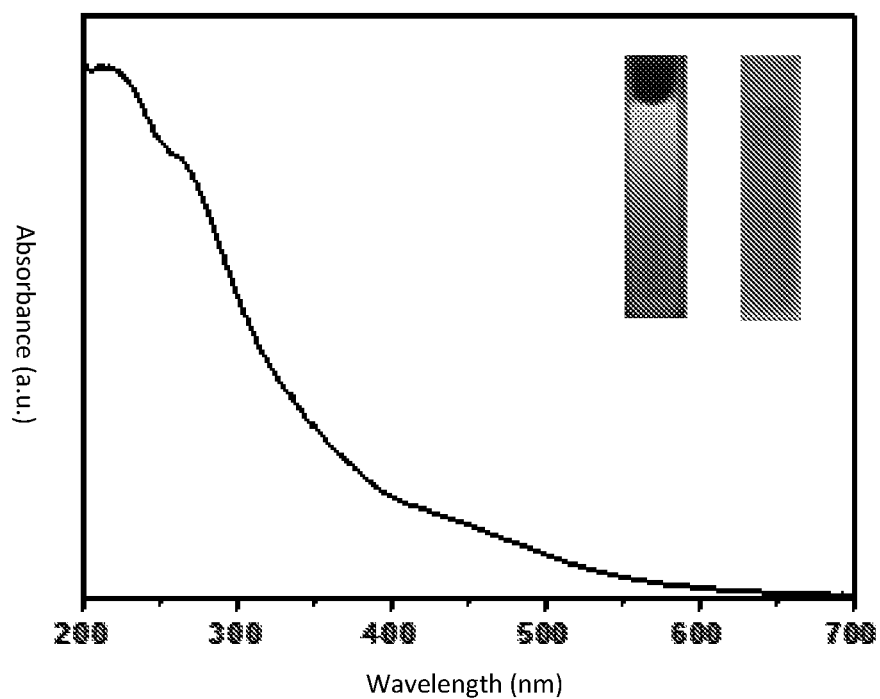
FIG. 12 is a fluorescent photograph of the fluorescent carbon nanomaterial prepared in Embodiment 1 of the present invention.

Transmission electron microscopy analysis is performed on the prepared fluorescent carbon nanoparticles, and the result is shown in FIG. 10; and statistical analysis of particle size distribution is performed for the transmission electron microscopy analysis, and the result is shown in FIG. 11. It can be known from the combination of FIGS. 10 and 11 that the size of the carbon nanoparticles is less than 3 nm. Fluorescence analysis is performed on the prepared fluorescent nanoparticles, and the test result is shown in FIG. 12; and it can be known from FIG. 12 that the nanoparticles are fluorescent.

Embodiment 2

The carbon material is prepared according to the approach of Embodiment 1, and the difference is that the time of the stirring reaction under the conditions of microwave heating is 30 min.

Embodiment 3

The carbon material is prepared according to the approach of Embodiment 1, and the difference is that the time of the stirring reaction under microwave heating is 10 min.

Embodiment 4

The carbon material is prepared according to the approach of Embodiment 1, and the difference is that the time of the stirring reaction under microwave heating is 90 min.

Embodiment 5

The carbon material is prepared according to the approach of Embodiment 1, and the difference is that the time of the stirring reaction under microwave heating is 120 min.

The productivities of the micron-sized particles (CMP), the fluorescent carbon nanoparticles (S-CNPs), and the graphite-like crystallite-based carbon nanoparticles (L-CNPs) prepared in Embodiments 1-5 are separately tested and calculated based on the equation that productivity=the mass of the product/the mass of the raw charcoal, to obtain the productivities of the three products at different reaction times; and the results are shown in Table 1.

The yields of the micron-sized particles (CMP), the fluorescent carbon nanoparticles (S-CNPs), and the graphite-like crystallite-based carbon nanoparticles (L-CNPs) prepared in Embodiments 1-5 are separately tested and calculated based on the equation that yield=the mass of carbon atoms in the product/the mass of carbon atoms in the raw charcoal, to obtain the yields of various products converted from the carbon atoms in the raw material at different reaction times; and the results are shown in Table 1.

TABLE 1

Numerical values of the productivities of the three products and the yields of the various products converted from the carbon atoms in the raw material in Embodiments 1-5

| Products | | Reaction time (min) | | | | |
| --- | --- | --- | --- | --- | --- | --- |
| | | 10 | 30 | 60 | 90 | 120 |
| CMPs | Mass (g) | 3.682 | 0.276 | 0.034 | 0.021 | 0.014 |
| | Yield (%) | 92.05 | 6.90 | 0.85 | 0.53 | 0.35 |
| | Carbon element conversion rate (%) | 77.35 | 4.43 | 0.36 | 0.17 | 0.08 |
| L-CNPs | Mass (g) | 0.214 | 3.114 | 2.736 | 2.412 | 1.786 |
| | Yield (%) | 5.35 | 77.85 | 68.40 | 60.30 | 44.65 |
| | Carbon element conversion rate (%) | 3.17 | 46.48 | 40.56 | 36.15 | 26.90 |
| S-CNPs | Mass (g) | 0.008 | 0.038 | 0.246 | 0.472 | 0.652 |
| | Yield (%) | 0.20 | 0.95 | 6.15 | 11.80 | 16.30 |
| | Carbon element conversion rate (%) | 0.11 | 0.58 | 3.63 | 7.08 | 9.83 |
| Gas Products | Mass (g) | | | | | |
| | Yield (%) | | | | | |
| | Carbon element conversion rate (%) | 19.37 | 48.51 | 55.45 | 56.60 | 63.19 |

It can be known from Table 1 that when the reaction time is extended to 30 minutes, especially between 10 minutes and 30 minutes, the yield of the L-CNPs sharply increases to 77.85%, but the yield of the CMP sharply decreases, and the yield of the S-CNP is very low and almost negligible. That is, in the oxidation process of the raw charcoal, in addition to the gas products, L-CNPs are mainly obtained. This indicates that the oxidation of the raw charcoal is not to gradually decrease the particle size of charcoal particles to 10 nanometers or less by surface etching, but instead is to disintegrate large charcoal particles by selectively oxidizing the amorphous charcoal bonded to the crystallites to release a carbon nanomaterial based on graphite-like crystallites, i.e., the L-CNPs.

According to the conversion rate of the carbon atoms in the raw charcoal, it can be known from Table 1 that the carbon atoms in the raw material are mainly converted into L-CNPs and gas products after the raw charcoal is oxidized for 30 minutes; the quantities of relatively large particles CMP and the smallest-sized particles S-CNPs are very small; the carbon atom conversion rate of a nanocarbon material of the L-CNPs accounting for the raw charcoal may reach 50% (the oxidation time is 30 min), and even if the oxidation time is 120 min, the conversion rate can also reach 30%. Therefore, it is obvious that a large quantity of L-CNPs nanoparticles can be prepared in a short oxidation time; moreover, it can be seen that when the oxidation time is extended from 10 min to 30 min, the raw charcoal can be dissociated into nanoparticles L-CNPs very quickly. This indicates that the oxidant penetrates into the charcoal structure, and the amorphous charcoal bonded to the graphite-like crystallites is oxidatively etched away in a short time, thereby leading to dissociation of the graphite-like microcrystalline charcoal in a short time.

Elemental analysis is performed on the graphite-like crystallite-based carbon nanoparticles (L-CNPs) prepared in Embodiments 1-5, and the result is shown in Table 2.

TABLE 2

Element contents of the graphite-like crystallite-based carbon nanoparticles prepared in Embodiments 1-5

| | | Element contents, % | | | |
|---|---|---|---|---|---|
| | | C | O | N | H |
| Reaction time, min | 10 | 53.60 | 35.19 | 7.78 | 2.26 |
| | 30 | 54.21 | 35.23 | 7.56 | 2.21 |
| | 60 | 53.84 | 34.66 | 7.08 | 2.17 |
| | 90 | 54.45 | 35.24 | 8.00 | 2.50 |
| | 120 | 54.70 | 34.00 | 7.47 | 2.39 |

It can be known from FIG. 2 that the prepared novel carbon nanomaterials of L-CNPs have a carbon content of 53-55% and an oxygen content of 34-35.3%, and also have a hydrogen element content of more than 2.0%. This indicates that the L-CNPs contain a large quantity of oxygen-containing groups. Regardless of the length of the oxidation time, the contents of the carbon elements, the oxygen elements, the nitrogen elements, and the hydrogen elements in the prepared L-CNPs remain substantially unchanged. This indicates that the ratio of C:O:H of the L-CNPs prepared at different oxidation times is basically unchanged, which fully demonstrates that the L-CNPs prepared from the same raw charcoal have the same chemical composition and structure, and the particle size also remains substantially unchanged. That's because if the particle size is decreased, the decrease will inevitably cause a significant change in the proportion of C:O elements. This further demonstrates that the L-CNPs are carbon nanomaterials obtained based on graphite-like crystallites.

Embodiment 6

Nitric acid is mixed proportionally with perchloric acid according to the substance quantity ratio of 1:1, and a nitric acid solution is mixed with a perchloric acid solution according to the volume ratio of 1:1.1 to prepare an oxidant solution, where the mass concentration of the nitric acid solution is 65%, and the mass concentration of the perchloric acid solution is 70%.

4.00 g of coconut shell activated charcoal is mixed with 100 mL of oxidant solution; the mixed solution is placed in a microwave synthesizer, and heated to 70° C. under microwave power of 500 W; and the heating is stopped after stirring for 60 min to obtain a reaction liquid.

The reaction liquid is cooled to room temperature, and an alkaline solution is added to neutralize the acid solution until the pH value of the solution reaches 5. The reaction liquid with a well regulated pH is transferred into an ultrafiltration cup, and ultrafiltration washing is performed on the reactant by using an ultrafiltration membrane having a molecular weight cut off of 1000 Da until the filtrate becomes colorless and transparent and the electrical conductivity is less than 20 us/cm.

The suspension in the ultrafiltration cup is repeatedly centrifuged three times in a centrifuge having a rotational speed of 4000 rpm for 10 min each time to remove large particles, and the large particles obtained by the centrifugations are collected, i.e., micron-sized particles; the filtrate from each ultrafiltration washing process is collected together for rotary-evaporation concentration, then salts in the concentrated filtrate are removed by dialysis, and finally freeze drying is performed to obtain fluorescent carbon nanoparticles of small particle size; the centrifuged suspension is subjected to rotary-evaporation concentration, and then is freeze-dried or heat-dried to remove moisture to obtain carbon nanoparticles.

Embodiment 7

The carbon material is prepared according to the approach of Embodiment 6, and the difference is that the temperature of microwave heating is 80° C.

Embodiment 8

The carbon material is prepared according to the approach of Embodiment 6, and the difference is that the temperature of microwave heating is 90° C.

Embodiment 9

The carbon material is prepared according to the approach of Embodiment 6, and the difference is that the temperature of microwave heating is 100° C.

The productivities of the micron-sized particles (CMP), the fluorescent carbon nanoparticles (S-CNPs), and the graphite-like crystallite-based carbon nanoparticles (L-CNPs) prepared in Embodiments 6-9 are separately tested and calculated based on the equation that productivity=the mass of the product/the mass of the raw charcoal, to obtain the yields of the three products at different reaction times; and the results are shown in Table 3.

The yields of the micron-sized particles (CMP), the fluorescent carbon nanoparticles (S-CNPs), and the graphite-like crystallite-based carbon nanoparticles (L-CNPs) prepared in Embodiments 6-9 are separately tested and calculated based on the equation that yield=the mass of carbon atoms in the product/the mass of carbon atoms in the raw charcoal, to obtain the yields of various products converted from the carbon atoms in the raw material at different reaction times; and the results are shown in Table 3.

TABLE 3

Numerical values of the productivities of the three products and the yields of the various products converted from the carbon atoms in the raw material in Embodiments 6-9

| Products | | Reaction temperature (° C.) | | | |
|---|---|---|---|---|---|
| | | 70 | 80 | 90 | 100 |
| CMP | Mass (g) | 4.091 | 2.670 | 0.076 | 0.034 |
| | Yield (%) | 102.27 | 66.75 | 1.90 | 0.85 |
| | Carbon element conversion rate (%) | 72.23 | 44.24 | 0.67 | 0.36 |
| L-CNPs | Mass (g) | 0 | 0.619 | 2.983 | 2.736 |
| | Yield (%) | 0 | 15.47 | 74.57 | 68.40 |
| | Carbon element conversion rate (%) | 0 | 9.34 | 43.89 | 40.56 |
| S-CNPs | Mass (g) | 0 | 0 | 0.046 | 0.246 |
| | Yield (%) | 0 | 0 | 1.60 | 6.15 |
| | Carbon element conversion rate (%) | 0 | 0 | 0.68 | 3.63 |
| Gas Products | Mass (g) | | | | |
| | Yield (%) | | | | |
| | Carbon element conversion rate (%) | 27.77 | 46.42 | 54.76 | 55.45 |

It can be seen from Table 3 that when the temperature is lower than 70° C., the oxidation occurs only on the surface of the charcoal, and the oxidation cannot obtain nano-sized carbon particles. When the temperature rises to 80° C., more than 10% of L-CNP starts to be obtained, but no S-CNP is found. At this time, the raw charcoal particles have not yet been substantially broken, and mainly exist in the form of micron-sized carbon particles. At 90° C., the L-CNP carbon nanomaterial achieves a yield of 77%, which exceeds the yield of any other product. From the conversion rate of carbon atoms, 44% of the carbon atoms in the raw material are converted to the L-CNP. As the oxidation temperature is further increased, the yield of the L-CNP is decreased but the S-CNP is increased.

Elemental analysis is performed on the graphite-like crystallite-based carbon nanoparticles (L-CNPs) prepared in Embodiments 6-9, and the result is shown in Table 4.

TABLE 4

Elemental analysis result of the graphite-like crystallite-based carbon nanoparticles prepared in Embodiments 6-9

| | | Element content of L-CNP, % | | | |
|---|---|---|---|---|---|
| | | C | O | N | H |
| Reaction temperature, ° C. | 70 | | | | |
| | 80 | 54.78 | 33.92 | 7.73 | 2.95 |
| | 90 | 53.43 | 34.57 | 7.39 | 2.88 |
| | 100 | 53.84 | 34.66 | 7.08 | 2.17 |

Similar to Table 2, the carbon, oxygen, hydrogen, and nitrogen element contents of the L-CNPs prepared at different reaction temperatures are basically similar. This indicates that the ratio of C:O:H of the L-CNPs prepared at different temperatures is basically unchanged. It is again indicated that the L-CNPs prepared from the same raw charcoal have highly similar chemical compositions and structures, and the particle sizes also remain substantially unchanged.

Embodiment 10

Nitric acid is mixed proportionally with perchloric acid according to the substance quantity ratio of 1:2, and a nitric acid solution is mixed with a perchloric acid solution according to the volume ratio of 1:2.2 to prepare an oxidant solution, where the mass concentration of the nitric acid solution is 65%, and the mass concentration of the perchloric acid is 70%.

4.00 g of coconut shell activated charcoal is mixed with 100 mL of oxidant solution; the mixed solution is placed in a microwave synthesizer, and heated to 100° C. under microwave power of 500 W; and the heating is stopped after stirring for 60 min.

The reaction liquid is cooled to room temperature, and an alkaline solution is added to neutralize the acid solution until the pH value of the solution reaches 5. The reaction liquid with a well regulated pH is transferred into an ultrafiltration cup, and ultrafiltration washing is performed on the reactant by using an ultrafiltration membrane having a molecular weight cut off of 1000 Da until the filtrate becomes colorless and transparent and the electrical conductivity is less than 20 us/cm.

The suspension in the ultrafiltration cup is repeatedly centrifuged three times in a centrifuge having a rotational speed of 4000 rpm for 10 min each time to remove large particles, and the large particles obtained by the centrifugations are collected, i.e., micron-sized particles; the filtrate from each ultrafiltration washing process is collected together for rotary-evaporation concentration, then salts in the concentrated filtrate are removed by dialysis, and finally freeze drying is performed to obtain fluorescent carbon nanoparticles of small particle size; the centrifuged suspension is subjected to rotary-evaporation concentration, and then is freeze-dried or heat-dried to remove moisture to obtain carbon nanoparticles.

Embodiment 11

The carbon material is prepared according to the approach of Embodiment 11, and the difference is that the substance quantity ratio of the nitric acid to the perchloric acid in the oxidant solution is 1:1.

Embodiment 12

The carbon material is prepared according to the approach of Embodiment 11, and the difference is that the substance quantity ratio of the nitric acid to the perchloric acid in oxidant solution preparation is 2:1.

The yields of the micron-sized particles (CMP), the fluorescent carbon nanoparticles (S-CNPs), and the graphite-like crystallite-based carbon nanoparticles (L-CNPs) prepared in Embodiments 10-12 are separately tested and calculated based on the equation that yield=the mass of carbon atoms in the product/the mass of carbon atoms in the raw charcoal, to obtain the yields of various products converted from the carbon atoms in the raw material at different reaction times; and the results are shown in Table 5. It can be known from Table 5 that the ratio of the two acids in the mixed acid significantly affects the oxidation of the charcoal and the yields of the various products. When the substance quantity ratio of the two acids is 1:1, the yield of the L-CNPs is the highest, reaching 68.4%, and the carbon atoms contained therein account for 40.5% of the carbon atoms in the raw charcoal.

TABLE 5

Numerical values of the yields of the various products converted from the carbon atoms in the raw material in Embodiments 10-12

| Products | | Molar ratio | | |
|---|---|---|---|---|
| | | 1:2 | 1:1 | 2:1 |
| CMP | Mass (g) | 0.473 | 0.034 | 0.838 |
| | Yield (%) | 11.82 | 0.85 | 20.95 |
| | Carbon element conversion rate (%) | 6.87 | 0.36 | 12.71 |
| L-CNPs | Mass (g) | 1.692 | 2.736 | 2.292 |
| | Yield (%) | 42.30 | 68.40 | 57.30 |
| | Carbon element conversion rate (%) | 24.02 | 40.56 | 33.44 |
| S-CNPs | Mass (g) | 0.136 | 0.246 | 0.052 |
| | Yield (%) | 3.40 | 6.15 | 1.30 |
| | Carbon element conversion rate (%) | 1.93 | 3.63 | 0.76 |
| Gas Products | Mass (g) | | | |
| | Yield (%) | | | |
| | Carbon element conversion rate (%) | 67.18 | 55.45 | 53.09 |

Elemental analysis is performed on the graphite-like crystallite-based carbon nanoparticles (L-CNPs) prepared in Embodiments 10-12, and the result is shown in Table 6.

TABLE 6

Elemental analysis result of the graphite-like crystallite-based carbon nanoparticles prepared in Embodiments 10-12

| Embodiments: | | Embodiment 10 | Embodiment 11 | Embodiment 12 |
|---|---|---|---|---|
| Element contents (%) | C | 51.56 | 53.84 | 52.99 |
| | O | 37.175 | 34.662 | 38.439 |
| | N | 7.97 | 7.08 | 6.37 |
| | H | 2.398 | 2.173 | 2.246 |

It can be known from Table 6 that the carbon elements, the oxygen elements, the nitrogen elements, and the hydrogen elements of the L-CNPs prepared by different mixed acids are not much different. Moreover, the L-CNPs have similar element contents to the L-CNPs prepared at different reaction times and reaction temperatures. This further indicates that these L-CNPs have similar structures and the same source, and are all oxidized derivatives of graphite-like crystallites.

Embodiment 13

Nitric acid is mixed proportionally with perchloric acid according to the substance quantity ratio of 1:1, and a nitric acid solution is mixed with a perchloric acid solution according to the volume ratio of 1:1.1 to prepare an oxidant solution, where the mass concentration of the nitric acid solution is 65%, and the mass concentration of the perchloric acid is 70%.

4.00 g of coconut shell activated charcoal of 60-80 meshes is mixed with 100 mL of oxidant solution; the mixed solution is placed in a microwave synthesizer, and heated to 100° C. under microwave power of 500 W; and the heating is stopped after stirring for 60 min.

The reaction liquid is cooled to room temperature, and an alkaline solution is added to neutralize the acid solution until the pH value of the solution reaches 5. The reaction liquid with a well regulated pH is transferred into an ultrafiltration cup, and ultrafiltration washing is performed on the reactant by using an ultrafiltration membrane having a molecular weight cut off of 1000 Da until the filtrate becomes colorless and transparent and the electrical conductivity is less than 20 us/cm.

The suspension in the ultrafiltration cup is repeatedly centrifuged three times in a centrifuge having a rotational speed of 4000 rpm for 10 min each time to remove large particles, and the large particles obtained by the centrifugations are collected, i.e., micron-sized particles; the filtrate from each ultrafiltration washing process is collected together for rotary-evaporation concentration, then salts in the concentrated filtrate are removed by dialysis, and finally freeze drying is performed to obtain fluorescent carbon nanoparticles of small particle size; the centrifuged suspension is subjected to rotary-evaporation concentration, and then is freeze-dried or heat-dried to remove moisture to obtain carbon nanoparticles.

Embodiment 14

The carbon material is prepared according to the approach of Embodiment 13, and the difference is that the coconut shell activated charcoal used in Embodiment 11 is replaced with a wood-based carbonized material.

Embodiment 15

The carbon material is prepared according to the approach of Embodiment 13, and the difference is that the coconut shell activated charcoal used in Embodiment 11 is replaced with a fir activated charcoal.

The productivities of the micron-sized particles (CMP), the fluorescent carbon nanoparticles (S-CNPs), and the graphite-like crystallite-based carbon nanoparticles (L-CNPs) prepared in Embodiments 13-15 are separately tested and calculated based on the equation that productivity=the mass of the product/the mass of the raw charcoal, to obtain the yields of the three products at different reaction times; and the results are shown in Table 7.

The yields of the micron-sized particles (CMP), the fluorescent carbon nanoparticles (S-CNPs), and the graphite-like crystallite-based carbon nanoparticles (L-CNPs) prepared in Embodiments 13-15 are separately tested and calculated based on the equation that yield=the mass of carbon atoms in the product/the mass of carbon atoms in the raw charcoal, to obtain the yields of various products converted from the carbon atoms in the raw material at different reaction times; and the results are shown in Table 7.

TABLE 7

Numerical values of the productivities of the three products and the yields of the various products converted from the carbon atoms in the raw material in Embodiments 13-15

| Products | | Coconut shell activated charcoal | Fir activated charcoal | Wood-based carbonized material |
|---|---|---|---|---|
| CMP | Mass (g) | 0.092 | 0 | 0.850 |
| | Yield (%) | 2.30 | 0 | 21.25 |
| | Carbon element conversion rate (%) | 1.04 | 0 | 15.93 |

TABLE 7-continued

Numerical values of the productivities of the three products and the yields of the various products converted from the carbon atoms in the raw material in Embodiments 13-15

| Products | | Coconut shell activated charcoal | Fir activated charcoal | Wood-based carbonized material |
|---|---|---|---|---|
| L-CNPs | Mass (g) | 2.119 | 1.732 | 2.189 |
| | Yield (%) | 52.97 | 43.30 | 54.72 |
| | Carbon element conversion rate (%) | 30.83 | 24.40 | 30.00 |
| S-CNPs | Mass (g) | 0.320 | 0.132 | 0.167 |
| | Yield (%) | 8.00 | 3.30 | 4.17 |
| | Carbon element conversion rate (%) | 4.66 | 1.86 | 2.29 |
| Gas Products | Mass (g) | | | |
| | Yield (%) | | | |
| | Carbon element conversion rate (%) | 63.47 | 73.74 | 51.78 |

It can be known from Table 7 that L-CNPs with a yield of more than 40% can be prepared using different activated charcoals and carbonized materials.

Elemental analysis is performed on the graphite-like crystallite-based carbon nanoparticles (L-CNPs) prepared in Embodiments 13-15, and the result is shown in Table 8.

TABLE 8

Elemental analysis result of the graphite-like crystallite-based carbon nanoparticles prepared in Embodiments 13-15

| Embodiments: | | Coconut shell activated charcoal | Fir activated charcoal | Wood-based carbonized material |
|---|---|---|---|---|
| Element contents (%) | C | 50.20 | 44.80 | 43.04 |
| | O | 37.432 | 41.623 | 44.714 |
| | N | 7.26 | 8.87 | 7.90 |
| | H | 3.312 | 3.763 | 3.800 |
| | S | 0.053 | 0.057 | 0.042 |

It can be seen from Table 8 that the element contents of L-CNPs prepared from different raw materials are significantly different. However, in the previous embodiments, the same raw charcoal is used, and the L-CNPs prepared at different temperatures, dosages of two acids and reaction times almost all have the same carbon and oxygen element contents. This is due to the difference in the structure of the graphite-like crystallites in different raw charcoals. This further proves that the L-CNPs are derived from graphite-like crystallites.

Embodiment 16

65% by mass of nitric acid is mixed proportionally with 95% by mass of sulfuric acid according to the substance quantity ratio of 1:1.

4.00 g of coconut shell activated charcoal is mixed with 100 mL of mixed acid solution; the mixed solution is placed in a microwave synthesizer, and heated to 100° C. under microwave power of 500 W; and the heating is stopped after stirring for 30 min to obtain a reaction liquid.

The reaction liquid is cooled to room temperature, and an alkaline solution is added to neutralize the acid solution until the pH value of the solution reaches 5. The reaction liquid with a well regulated pH is transferred into an ultrafiltration cup, and ultrafiltration washing is performed on the reactant by using an ultrafiltration membrane having a molecular weight cut off of 1000 Da until the filtrate becomes colorless and transparent and the electrical conductivity is less than 20 us/cm.

The suspension in the ultrafiltration cup is repeatedly centrifuged three times in a centrifuge having a rotational speed of 4000 rpm for 10 min each time to remove large particles, and the large particles obtained by the centrifugations are collected, i.e., micron-sized particles; the filtrate from each ultrafiltration washing process is collected together for rotary-evaporation concentration, then salts in the concentrated filtrate are removed by dialysis, and finally freeze drying is performed to obtain fluorescent carbon nanoparticles of small particle size; the centrifuged suspension is subjected to rotary-evaporation concentration, and then is freeze-dried or heat-dried to remove moisture to obtain carbon nanoparticles.

The obtained CMP is 0.186 g, L-CNPs are 2.474 g, and S-CNPs are 0.045 g. The carbon, oxygen, and hydrogen element contents of the prepared L-CNPs are 56.8%, 29.4%, and 1.03%, respectively.

X-ray photoelectron spectroscopy analysis is separately performed on the graphite-like crystallite-based carbon nanomaterials prepared in Embodiments 2-16, and the test results are consistent with those in Embodiment 1. It can be known that the prepared graphite-like crystallite-based carbon nanoparticles are rich in carboxyl groups, carbonyl groups, and C—O single bonds, where C—C content is 71.86%, C—O is 12.82%, C=O is 1.65%, and COO is 13.67%.

Infrared spectroscopy analysis is separately performed on the graphite-like crystallite-based carbon nanoparticles prepared in Embodiments 2-16, and the test results are shown in FIG. 4. It can be clear that the obtained graphite-like crystallite-based carbon nanoparticles contain a large quantity of carboxyl groups, carbonyl groups, and hydroxyl groups.

Atomic force microscopy analysis is performed on the prepared graphite-like crystallite-based carbon nanoparticles, and statistical analysis is performed according to the measured particle size in the atomic force micrograph, to obtain the thickness size of the graphite-like crystallite-based carbon nanoparticles of not more than 1.5 nanometers, which is consistent with that of graphite-like crystallites generally consisting of several layers of hexagonal carbon network planes.

Moreover, transmission electron microscopy analysis is performed on the graphite-like crystallite-based carbon nanoparticles prepared in embodiments 2-16. It can be known that the size of the prepared graphite-like crystallite-based carbon nanoparticles is about 5-10 nanometers.

Dispersibility analysis is performed on the graphite-like crystallite-based carbon nanoparticles prepared in embodiments 2-16, and it can be known that the carbon nanoparticles can be dispersed in water and can exist stably, but cannot be dispersed in a methanol solvent.

It can be known from the foregoing embodiments that the present application provides a graphite-like crystallite-based carbon nanomaterial and a preparation method thereof. The present invention obtains a carbon nanomaterial having graphite-like crystallites as structural units. In the preparation method provided by the present invention, the graphite-like crystallites can be oxidatively etched by using the oxidant solution for oxidation for 10-100 min only under microwave heating, so that the amorphous charcoal bonded between the graphite-like crystallites is selectively etched away, a graphite-like crystallite-based carbon nanomaterial can be obtained by dissociation, without performing layer-by-layer etching on the raw material; and therefore, the preparation efficiency is improved, and the consumed time is greatly lower than the time of 10 hours or more consumed in the art for completing the oxidative etching.

Embodiment 17

Lead nitrate solutions having concentrations of 0.00125 mol/L, 0.0025 mol/L, 0.005 mol/L, 0.01 mol/L, 0.02 mol/L, 0.04 mol/L, and 0.08 mol/L are prepared separately, and the accurate concentration of $Pb^{2+}$ is measured by an atomic absorption spectrometer to serve as the initial concentration of $Pb^{2+}$, which is recorded as $C_i$(mg/mL).

25 mL of the lead nitrate solutions having different concentrations are weighed in sequence, and are respectively put in separate centrifuge tubes, and then 25 mg of L-CNPs are added to each centrifuge tube and mixed uniformly.

The pH value of the mixture is regulated to 6.9 with 5 mol/L of sodium hydroxide solution and nitric acid solution, the volume of the added sodium hydroxide solution and nitric acid solution is measured using a measuring cylinder, and the volume difference before and after the addition is the amount of addition. The total volume of the added liquid is recorded as $V_a$(mL).

A centrifuge tube containing the mixture is placed in a constant temperature oscillating bed and is maintained at 25° C. for constant temperature oscillation for 24 h, and the oscillation rate is 150 oscillations per minute.

After the oscillation is finished, the mixture is centrifuged (3000 r/min), and the supernatant is filtered using a 220 nm nylon filter head. The concentration of $Pb^{2+}$ in the filtrate is measured using an atomic absorption spectrometer to serve as an equilibrium concentration after adsorption, which is recorded as $C_e$(mg/L).

At each initial concentration, when the adsorption of $Pb^{2+}$ by L-CNPs reaches equilibrium, the adsorption quantity $Q_e$(mg/g) is calculated according to the following formula: $Q_e=1000(25C_i-C_e(25+V_a))/25$, and the adsorption effect is shown in Table 9.

TABLE 9

Adsorption effect data of L-CNPs on $Pb^{2+}$ in Embodiment 17

| Initial concentration (mg/L) | Equilibrium concentration (mg/L) | Adsorption quantity (mg/L) |
| --- | --- | --- |
| 16560.0 | 4592.0 | 11279.2 |
| 8352.0 | 3447.2 | 4604.0 |
| 4244.0 | 2117.2 | 2045.6 |
| 1944.4 | 603.0 | 1325.6 |
| 972.6 | 59.2 | 912.6 |
| 471.3 | 0 | 471.3 |

It can be known from Table 9 that the graphite-like crystallite-based carbon nanomaterial provided by the present invention has a very high adsorption quantity to all lead ions in the solution, especially in a high concentration metal ion solution. The adsorption quantity of the graphite-like carbon nanomaterial provided by the present invention to lead ions is 10 times as much as its own mass, and is almost 10 times that of a common adsorbent material.

Embodiment 18

Copper nitrate solutions having concentrations of 0.00125 mol/L, 0.0025 mol/L, 0.005 mol/L, 0.01 mol/L, 0.02 mol/L, 0.04 mol/L, and 0.08 mol/L are prepared separately, and the accurate concentration of $Cu^{2+}$ is measured by an atomic absorption spectrometer to serve as the initial concentration of $Cu^{2+}$, which is recorded as $C_i$(mg/mL).

25 mL of the copper nitrate solutions having different concentrations are weighed in sequence, and are respectively put in separate centrifuge tubes, and then 25 mg of L-CNPs are added to each centrifuge tube and mixed uniformly.

The pH value of the mixture is regulated to 4.6 with 5 mol/L of sodium hydroxide solution and nitric acid solution, the volume of the added sodium hydroxide solution and nitric acid solution is measured using a measuring cylinder, and the volume difference before and after the addition is the amount of addition. The total volume of the added liquid is recorded as $V_a$(mL).

A centrifuge tube containing the mixture is placed in a constant temperature oscillating bed and is maintained at 25° C. for constant temperature oscillation for 24 h, and the oscillation rate is 150 oscillations per minute.

After the oscillation is finished, the mixture is centrifuged (3000 r/min), and the supernatant is filtered using a 220 nm nylon filter head. The concentration of $Cu^{2+}$ in the filtrate is measured using an atomic absorption spectrometer to serve as an equilibrium concentration after adsorption, which is recorded as $C_e$(mg/L).

At each initial concentration, when the adsorption of $Cu^{2+}$ by L-CNPs reaches equilibrium, the adsorption quantity $Q_e$(mg/g) is calculated according to the following formula: $Q_e=1000(25C_i-C_e(25+V_a))/25$, and the adsorption effect is shown in Table 10.

TABLE 10

Adsorption effect data of L-CNPs on $Cu^{2+}$ in Embodiment 18

| Initial concentration (mg/L) | Equilibrium concentration (mg/L) | Adsorption quantity (mg/L) |
| --- | --- | --- |
| 5201.6 | 4585.6 | 472.8 |
| 2612.8 | 2372.8 | 160.4 |
| 1346.4 | 1173.6 | 153.2 |
| 627.4 | 483.4 | 135.8 |
| 306.6 | 172.4 | 133.0 |
| 153.0 | 24.4 | 128.6 |

It can be known from Table 11 that the graphite-like crystallite-based carbon nanomaterial provided by the present invention also has a very high adsorption quantity to copper ions in the solution. The adsorption quantity is much higher than the adsorption quantities of porous charcoal materials, such as activated charcoals, which are usually only several tens of mg/g, and is equivalent to or slightly higher than the adsorption quantities of graphene oxides and the like to the copper ions.

Figure 13:
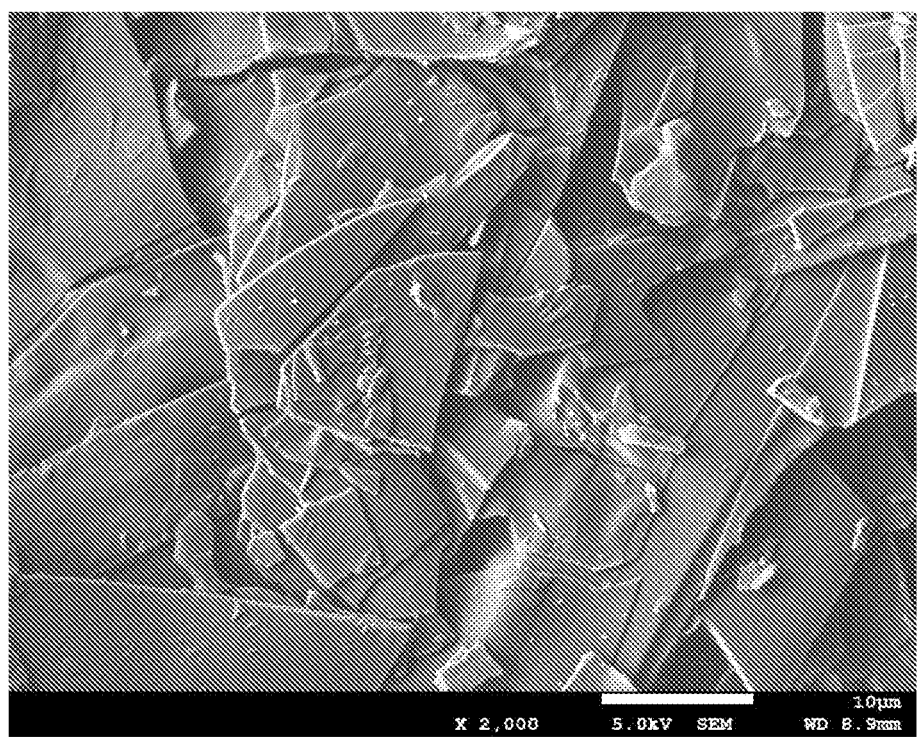
FIG. 13 is a SEM image of a carbon nanofilm self-assembled from L-CNPs prepared according to the present invention.

In Embodiment 19, the carbon nanomaterial prepared by freeze-drying the L-CNPs is in the form of a flaky solid; the width of the flaky solid may reach several tens of microns or more, but the thickness thereof is only about 100 nanometers. The results of scanning electron microscopy analysis are shown in FIG. 13. It is indicated that these graphite-like crystallite-based carbon nanomaterials dispersed in an aqueous solution have a tendency to be self-assembled into a nanofilm in the process of losing water, and have an application potential for producing carbon nanofilms.

COMPARATIVE EXAMPLE 1

Nitric acid is mixed proportionally with perchloric acid according to the substance quantity ratio of 1:1, and an acid A solution is mixed with an acid B solution according to the volume ratio of 1:1.1 to prepare an oxidant solution, where the mass concentration of the nitric acid solution is 65%, and the mass concentration of the perchloric acid solution is 70%.

4.00 g of coconut shell activated charcoal of 60-80 meshes is mixed with 100 mL of oxidant solution; the mixed solution is heated to 100° C. by means of an oil bath; and the heating is stopped after stirring for 30 min. The following operations are completely the same as those in Embodiment 2.

3.865 g of CMP, 0.003 g of L-CNPs, and 0.000 g of S-CNPs are obtained from 4.00 g of coconut shell charcoal. From comparative Embodiment 2 and comparative Example 1, it can be seen that almost no L-CNPs can be prepared through the oil bath heating approach, and thus no graphite-like microcrystalline charcoal can be dissociated to prepare the graphite-like crystallite-based carbon nanomaterial of the present invention. That is, these mixed oxidizing solutions cannot dissociate the graphite-like microcrystalline charcoal material under the conditions of oil bath heating.

The above description of the embodiment is only for helping to understand the method of the present invention and its core idea. It should be noted that, several improvements and modifications may be made by persons of ordinary skill in the art without departing from the principle of the present invention, and these improvements and modifications should also be considered to fall within the protection scope of the present invention. Various modifications to these embodiments are readily apparent to persons skilled in the art, and the generic principles defined herein may be practiced in other embodiments without departing from the spirit or scope of the invention. Thus, the present invention is not limited to the embodiments shown herein but falls within the widest scope consistent with the principles and novel features disclosed herein.

What is claimed is:

1. A graphite-like crystallite-based carbon nanomaterial, comprising, based on 100 parts by mass of chemical composition, 50-60 parts of carbon, 30-45 parts of oxygen, and 1-3 parts of hydrogen, wherein structural units of the graphite-like crystallite-based carbon nanomaterial are graphite-like crystallites; the particle size of the graphite-like crystallite-based carbon nanomaterial is 5-10 nm; and the graphite-like crystallite-based carbon nanomaterial is a non-fluorescent carbon nanomaterial.

2. The graphite-like crystallite-based carbon nanomaterial according to claim 1, wherein the thickness of the graphite-like crystallite-based carbon nanomaterial is less than or equal to 1.5 nm.

3. The graphite-like crystallite-based carbon nanomaterial according to claim 1, wherein the graphite-like crystallite-based carbon nanomaterial is a polar carbon nanomaterial.

4. The graphite-like crystallite-based carbon nanomaterial according to claim 3, wherein the graphite-like crystallite-based carbon nanomaterial contains a carboxyl group, a carbonyl group, a hydroxyl group, and an ether group.

5. A preparation method of the graphite-like crystallite-based carbon nanomaterial according to claim 1, comprising the following steps:
(1) mixing an oxidant solution with a graphite-like microcrystalline charcoal material, and oxidizing the mixture under the conditions of microwave heating to obtain an oxidizing feed solution; the oxidant solution comprising a mixed solution of a first acid and a second acid; and the first acid being nitric acid and the second acid being perchloric acid or sulfuric acid;
(2) regulating the pH value of the oxidizing feed solution obtained in step (1) to 3-8, to obtain a prefiltration system;
(3) subjecting the prefiltration system obtained in step (2) to ultrafiltrations, to obtain a suspension and a filtrate;
(4) separating the suspension obtained in step (3), to obtain a fine suspension; and
(5) removing moisture in the fine suspension obtained in step (4), to obtain the graphite-like crystallite-based carbon nanomaterial.

6. The preparation method according to claim 5, wherein the ratio of the mass of the graphite-like microcrystalline charcoal material to the volume of the oxidant solution in step (1) is 1 g:(20-50)mL;
the molar ratio of the first acid to the second acid in the oxidant solution is (0.5-2):1;
the oxidant solution is obtained by mixing a first acid solution and a second acid solution; the mass concentration of the first acid solution is 65-68%, and the mass concentration of the second acid solution is 70-72%; and the volume ratio of the first acid solution to the second acid solution is 1:(0.5-2.5).

7. The preparation method according to claim 5, wherein the power of the microwave heating in step (1) is 500-1,000 W.

8. The preparation method according to claim 5, wherein the temperature of the microwave heating in step (1) is 75-110° C., and the time of the microwave heating is 10-150 min.

9. The preparation method according to claim 5, wherein the graphite-like microcrystalline charcoal material in step (1) comprises one or more of a wood charcoal, a bamboo charcoal, a shell charcoal, a wood-based activated charcoal, a shell activated charcoal, a bamboo activated charcoal, and a coal-based activated charcoal.

10. The preparation method according to claim 5, wherein the number of the ultrafiltrations in step (3) is based on the electrical conductivity of the filtrate obtained by the ultrafiltrations, and the ultrafiltrations are completed when the electrical conductivity of the filtrate obtained by the ultrafiltrations reaches 20 us/cm or less.

11. The preparation method according to claim 5, wherein the molecular weight cut off of an ultrafiltration membrane for the ultrafiltrations in step (3) is 1,000 Da.

12. The preparation method according to claim 5, wherein after a filtrate is further obtained after the ultrafiltrations in step (3), the filtrate is concentrated, dialyzed and dried in sequence to obtain fluorescent carbon nanoparticles, wherein the particle size of the fluorescent carbon nanoparticles is 1-3 nm.

13. The preparation method according to claim 5, wherein the separations in step (4) are centrifugations; there are at least three centrifugations, and the time of each centrifugation is 10 min; and the rotational speed of each centrifugation is independently 4,000-8,000 rpm.

14. The preparation method according to claim 5, wherein micron-sized carbon particles are further obtained after the separations in step (4).

15. The preparation method according to claim 5, wherein the moisture is removed in step (5) by concentration and drying in sequence.

* * * * *